United States Patent [19]

Randall et al.

[11] 4,315,395
[45] Feb. 16, 1982

[54] JACK STAND FOR AGRICULTURAL ATTACHMENT

[75] Inventors: Stephen E. Randall, Narvon; Carl G. Overly, New Holland, both of PA

[73] Assignee: Sperry Corporation, New Holland, Pa.

[21] Appl. No.: 142,491

[22] Filed: Apr. 21, 1980

[51] Int. Cl.³ .......................................... A01D 35/12
[52] U.S. Cl. ............................ 56/10.1; 56/DIG. 9; 280/765
[58] Field of Search ................ 56/10.1, DIG. 9; 248/188.2, 188.5, 188.8, 188.9; 280/763, 764, 765, 766

[56] References Cited

U.S. PATENT DOCUMENTS

| | | | |
|---|---|---|---|
| 2,323,423 | 7/1943 | Schmidt et al. | 248/188.5 |
| 3,489,428 | 1/1970 | Hunter et al. | 280/765 |
| 3,641,747 | 2/1972 | Bobard | 56/15.6 |
| 3,665,688 | 5/1972 | Sheehan et al. | 56/14.6 |
| 3,682,497 | 8/1972 | Dalton | 280/765 |
| 4,172,392 | 10/1979 | Foster | 280/289 R |

*Primary Examiner*—Robert A. Hafer
*Attorney, Agent, or Firm*—C. Hercus Just; Frank A. Seemar; Larry W. Miller

[57] ABSTRACT

A jack stand for attachments, such as the feeder house/header combination, to agricultural machines, such as a combine, is disclosed wherein the jack stand includes a supporting plate attachable to the attachment and provided with an arcuate row of holes spaced even radial distances about a pivot and a pair of telescoping leg members, one of which is pivotally connected at one end to the pivot. A bracket, spaced from the pivot at said same radial distance from said pivot as the arcuate row of holes, is affixed to one of the leg members to receive a pin passed through a selected hole of said arcuate row thereof to establish said leg members at a desired angle relative to a supporting surface. One of the leg members includes a row of transverse holes which is alignable with at least one transverse hole in the other leg member to receive a pin therethrough to establish a desired length of said leg members. A shoe is pivotally connected to the outer end of the other leg member at a point offset from the center of gravity of the shoe. The jack stand being operable to effect a substantial range of vertical support distances between the pivot adjacent the attachment and a supporting surface engaged by said shoe, such that the minimum support distance required of the jack stand is less than the total length of the telescoping leg members in their collapsed state.

3 Claims, 3 Drawing Figures

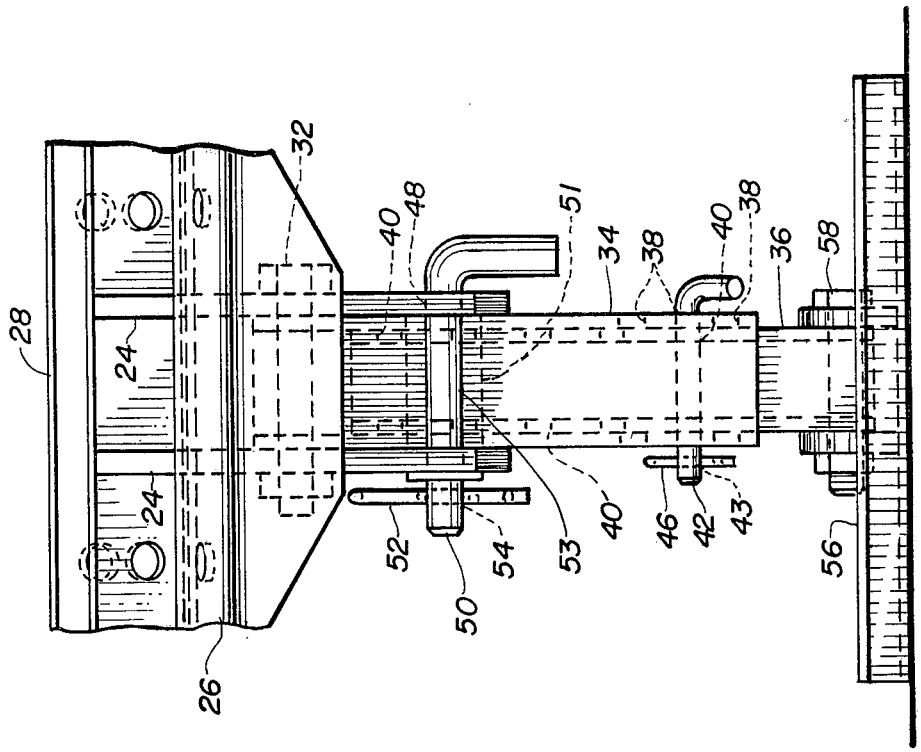
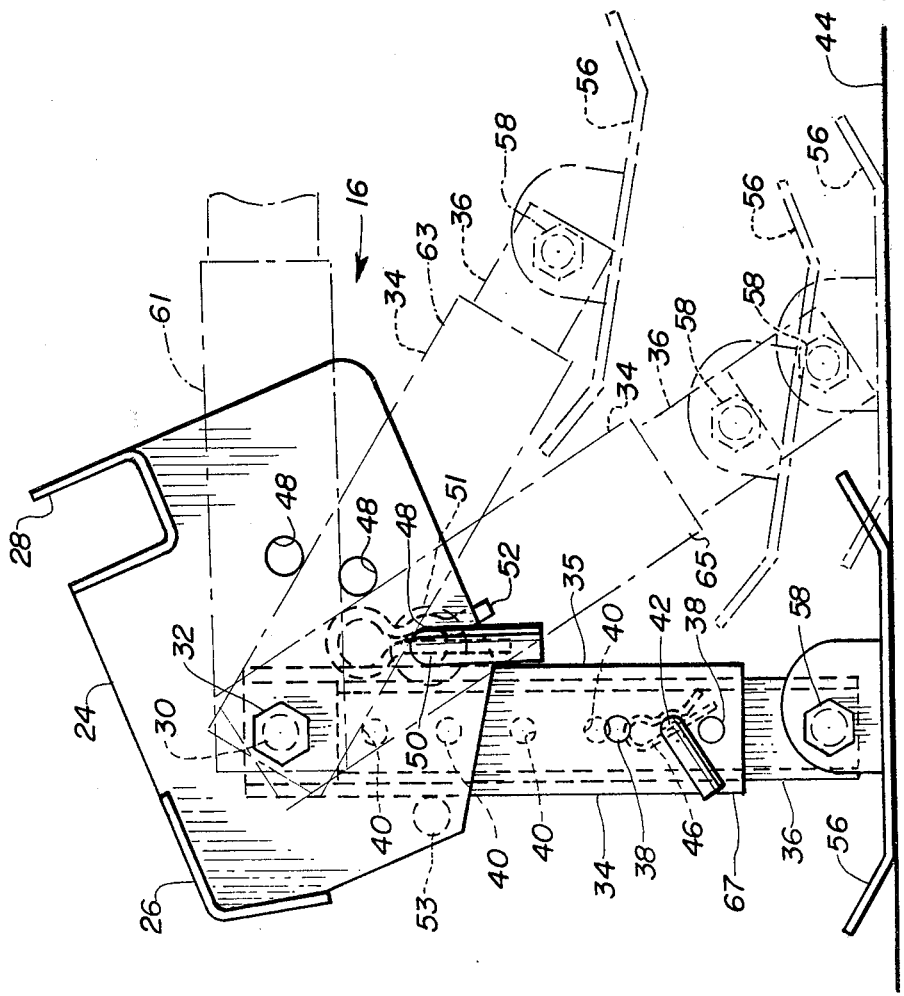

JACK STAND FOR AGRICULTURAL ATTACHMENT

BACKGROUND OF THE INVENTION

The present invention pertains to a jack stand for use with attachments of heavy type connectable to wheeled-type powered agricultural machines, such as a combine, for use in harvesting operations and the like. Many such types of agricultural attachments are exchangeable with the powered machine for use with different crops or different harvesting procedures, whereby it is highly convenient to have the attachment at the desired vertical position to be reconnected to the powered machine when use thereof is desired. Many types of equipment of this nature are very heavy. Also, rarely are such attachments of the same general shape although the part to be attached to the powered machine should be at the same vertical position above the ground or floor surface of a shed or building to render the attachment readily reconnectable to the powered machine when an exchange of attachments is to be made without requiring jacks or hoists.

Many types of jack stands have been developed heretofore for agricultural equipment and otherwise and the prior U.S. Patents, as listed below, represent a somewhat overall view of different types of drawbars capable of providing adjustable vertical support for tongues or drawbars of agricultural equipment:

U.S. Pat. No. 2,225,157, Court, Dec. 17, 1940
U.S. Pat. No. 2,580,545, Hill, Jan. 1, 1952
U.S. Pat. No. 2,672,318, Lee, Mar. 16, 1954
U.S. Pat. No. 2,836,432, Delp et al, May 27, 1958
U.S. Pat. No. 2,970,810, Zich et al, Feb. 7, 1961
U.S. Pat. No. 3,181,891, Moats, May 4, 1965

It will be seen from the foregoing patents that, in general, pivoted leg arrangements have been employed heretofore to provide vertical adjustment for the outer ends of tongues or drawbars relative to the ground and, in addition, the use of a pair of longitudinally movable leg members also is old, even to the extent of employing a row of holes in one member and at least one hole in the other member to receive a securing pin between aligned holes therein when a desired longitudinal adjustment of the telescoping members has been arranged.

In view of the fact, however, that many types of attachments for modern agricultural equipment have shapes and body surfaces which normally are at different distances above the ground in stored, disconnected condition, and further in view of the fact that the maximum support distance is more than twice as great as the minimum support distance, coupled with the necessity that the jack stand must be compact enough to be stored during operation of the attachment without interference with the operative parts of the attachment, attaching a jack stand thereto to maintain the connecting parts of the attachment at the level required for reconnection to the powered machine presents problems. The prior art has not developed a suitable adjustable jack stand capable of being attached to a range of different attachments to support the attachments at the desired level when stored or parked in inoperative condition and still be compactly stored during operation of the attachment.

SUMMARY OF THE INVENTION

It is the primary object of the present invention to provide a much more versatile and universal type of jack stand for use particularly with agricultural attachment units wherein a wide range of different shapes and attaching surfaces exist to which a jack stand of a given type is provided for attachment thereto of a nature which is capable of a wide range of adjustment of vertical distances by providing a support plate connectable at a suitable location upon the attachment unit and having a pivot thereon and an arcuate row of holes extending around said pivot at even radial distances and pivotally connect one end of a pair of telescoping leg members to said pivot of said supporting plate, one of said telescoping leg members having a pin means associated therewith to selectively fixedly dispose the pair of telescoping leg members at a desired angle with respect to said attachment unit and the supporting ground surface and, in conjunction therewith, one of said telescoping leg members is provided with a row of transverse holes and the other leg member is provided with a least one transverse hole to receive a locking pin inserted through suitably aligned holes in said members when the same have been extended or contracted a desired amount to adapt the same to a given vertical dimension required by a certain agricultural attachment unit, a shoe also being connected to the outer end of the other leg member for engagement with the ground, whereby the combination of arc and length adjustment is used to obtain the desired working range of supporting distances between said attachment unit and the ground.

Another object of the invention is to pivotally connect the aforementioned shoe to the outer end of the other leg member with the pivot for the shoe being offset forwardly of the center of gravity of the shoe with respect to the direction in which the vehicle or implement is moved in a forward direction and thereby cause the trailing end of the shoe to extend lower than the forward end thereof, whereby if, during transportation, said shoe engages an obstruction, it will be in a position to be cammed over the same, rather than sustain damage.

It is a further object of this invention to provide a jack stand which is compactly collapsible in a stored inoperative position and is operable to provide a range of vertical support distances wherein the maximum required vertical support distance is more than twice as great as the minimum required vertical support distance.

It is a still further object of this invention to provide a jack stand for an agricultural attachment which is durable in construction, inexpensive of manufacture, facile in assemblage and simple and effective in use.

These and other objects are accomplished according to the instant invention by providing a jack stand for attachments, such as the feeder house/header combination, to agricultural machines, such as a combine wherein the jack stand includes a supporting plate attachable to the attachment and provided with an arcuate row of holes spaced even radial distances about a pivot and a pair of telescoping leg members, one of which is pivotally connected at one end to the pivot. A bracket, spaced from the pivot at said same radial distance from said pivot as the arcuate row of holes, is affixed to one of the leg members to receive a pin passed through a selected hole of said arcuate row thereof to establish said leg members at a desired angle relative to a supporting surface. One of the leg members includes a row of transverse holes which is alignable with at least one transverse hole in the other leg member to receive a pin therethrough to establish a desired length of said leg members. A shoe is pivotally connected to the outer end of the other leg member at a point offset from the center of gravity of the shoe. The jack stand being operable to effect a substantial range of vertical support distances between the pivot adjacent the attachment and a supporting surface engaged by said shoe, such that the minimum support distance required of the jack stand is less than the total length of the telescoping leg members in their collapsed state.

Details of the foregoing objects and of the invention, as well as other objects thereof, are set forth in the following specification and the accompanying drawings comprising a part thereof.

BRIEF DESCRIPTION OF THE DRAWINGS

FIG. 2 is a greatly enlarged side elevation of an exemplary jack stand illustrated respectively in two different positions on the attachment shown in FIG. 1, one position in this figure being in full lines and several alternate positions being shown in phantom.

FIG. 3 is a fragmentary front view of the jack stand shown in FIG. 2.

DETAILED DESCRIPTION OF THE PREFERRED EMBODIMENT

Figure 1:
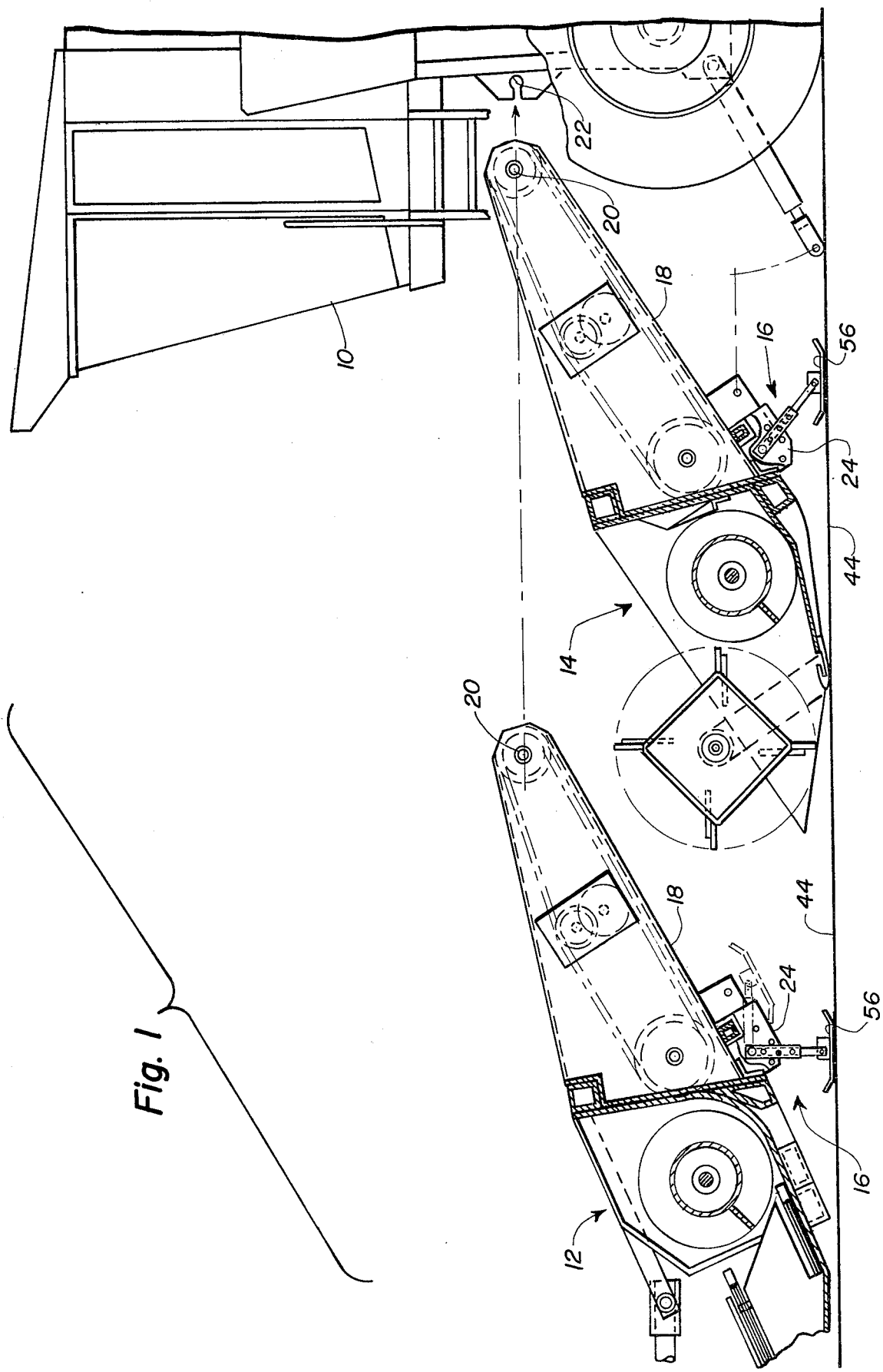
FIG. 1 is a somewhat diagrammatic side elevation, partly fragmentary and illustrating two exemplary different types of agricultural attachments which are interchangeable and connectable to a powered machine, such as a combine, which is fragmentarily illustrated.

Referring to FIG. 1, the forward end of a conventional agricultural combine 10 is shown fragmentarily, said combine being considered representative of a typical type of agricultural powered machine to which the present invention may be applied with respect to attachments connectable to such machine. In FIG. 1, for example, one type of header 12 is shown positioned in parked or inoperative position, but adapted readily to be connected to the receiving elements on the powered machine 10. Similarly, a second type of harvesting header 14 is shown which is different and adapted to harvest different crop material from that to which header 12 is adapted. Further, it will be seen from these two exemplary headers that the shapes and locations of the housings or casings are different, notwithstanding the fact that the principal purpose of the present invention is to provide a jack stand 16 which is intended to be substantially of a somewhat universal nature and adapted for attachment to a desired location of a relatively wide range of attachments for a powered agricultural machine, such as the combine 10.

As will be seen in FIG. 1, the upper rearmost end of the feeder housings 18, which are illustrated in FIG. 1, as alternates of each other, they, nevertheless, are provided with transverse shafts 20, the opposite ends of which are received, for example, within an appropriate pivot bracket 22 on the forward end of the powered machine comprising the exemplary combine 10. In view of the fact that attachments, such as the headers 12 and 14, are large and very heavy, it is impractical to handle the same manually with respect to connecting and disconnecting the same to the powered unit therefor, and were it not for the present invention, certain types of hoists or portable jacks would be necessary to adjust the connectable end of the attachment to a desired vertical position for ready connection to the pivot bracket 22, for example, of the powered machine 10. Details of the substantially universal type of jack stand comprising the present invention are best illustrated in FIGS. 2 and 3, to which attention is directed.

In FIG. 2, a side elevation of an attaching plate 24 is illustrated and is adapted for firm connection to a desired location, for example, of the undersurface of the feeder housing 18 of the several headers 12 and 14, shown in FIG. 1. Although certain attaching elements 26 and 28 are shown on the plate 24, it is to be understood that the present invention is not restricted to the use of said elements, in view of the fact that the attaching plate 24 may be secured by any suitable means, such as bolts passing through the plate for attachment to any convenient bracket or other means connectable to the attachment represented by the feeder housing 18, or otherwise.

The plate 24 is provided with a pivot hole 30, through which a pivot bolt 32 extends, said bolt also extending through the upper end of one of a pair of telescopically-related leg members 34 and 36, which may be tubular or of other cross-sectional geometric configurations, as desired. At least one of the leg members 34 and 36 is provided with a series of spaced holes 38, and the other member is provided with at least one similar hole 40, of which a plurality are illustrated in exemplary manner, for purposes of receiving a positioning pin 42, which is inserted through aligned holes in the members 34 and 36, as when a desired elongated or vertical dimension thereof has been established between the attaching plate 24, and a ground surface 44, which may be actually a surface of the earth or a building, such as a barn floor, or otherwise. Once the elongated dimension of the combination members 34 and 36 has been established, with respect to the pivot 32, the pin 42 may be detachably secured by means of a spring-type snap pin 46, which extends through an appropriate hole 43 in the pin 42.

In addition to the contraction or elongation of the interfitting leg members 34 and 36, further adjustment of the vertical dimension between, for example, the ground surface 44 and the pivot 32, the present invention provides for additional adjustment in such vertical dimension between the pivot 32 and the ground surface 44 in the form of a series of holes or sockets 48 formed in an arcuate row relative to the pivot hole 30 and the bolt 32. A tubular bracket 51 is affixed to the rearward side 35 of the leg member 34 to receive a further positioning and locking pin 50 and lock the telescopible leg members 34 and 36 in the desired angular relationship, such as shown selectively in full lines, as well as in phantom, in FIG. 2, to establish a desired vertical relationship between the pivot hole 30 adjacent the feeder housing 18 and the ground surface 44. A stop 53 is provided between the attaching plates 24 to cooperate with the pin 50 to lock the leg members 34 and 36 in a vertical position, as seen in full lines in FIG. 2. To prevent accidental dislodgment of the pin 50 from the aligned holes, another spring-type snap pin 52 is mounted within transverse hole 54 in the positioning and locking pin 52.

A ground-engaging shoe 56, having upturned opposite ends is pivotally secured by another bolt 58 to the lower end of the member 36 in such manner that the bolt 58 is offset with respect to the center of gravity of shoe 56 so that when the shoe 56 is elevated above the ground level 44, it will cam the surface over any obstruction engaged by the shoe. A further advantage of this offset shoe mounting is that when the jack stand 16 is lowered from the transport position 61 to any operating position, the shoe 56 engages the ground 44 in the same manner as any obstruction and is, thereby, cammed into the proper ground engaging position.

In operation, when the required vertical support distance (as determined by the vertical distance between the pivot 32 and the ground 44) is within the range defined by the minimum collapsed length of the telescoping leg members 34 and 36, as is shown in full lines in FIG. 2, and the maximum extended length, the operator would remove the pin 50, lower the leg members 34, 36 from the transport position 61 to the vertically aligned position 67, lock the leg members 34, 36 in the vertical position 67 against the stop 53 by inserting the pin 50 through the tubular bracket 51 and an aligned hole 48, remove the pin 42, and extend or retract the telescoping leg member 36 until the desired length is attained. Corresponding holes 38 and 40 in leg members 34 and 36, respectively, are aligned and the pin 42 reinserted therethrough. Pins 42 and 50 can be locked into place by the spring-type snap pins 46 and 52, respectively.

If the required vertical support distance is less than the minimum collapsed length of the telescoping leg members 34 and 36, the operator would remove the positioning and locking pin 50 and rotate the leg members 34, 36 about the pivot bolt 32 until the ground-engaging shoe 56 is just above the ground 44, as is exemplified by position 65 in FIG. 2. The pin 50 would be inserted through the tubular bracket 51 and an aligned hole 48 and locked into place by the spring-type snap pin 52. The locking pin 42 would then be removed, the telescoping leg 36 extended until the ground-engaging shoe 56 engages the ground surface 44; whereupon, the pin 42 would be reinserted through aligned holes 38 and 40 and locked into place by the spring-type snap pin 46.

Position 63, as seen in FIG. 2, displays the position of the shoe 56 resulting from the offset mounting of the bolt 58 with respect to the center of gravity of the shoe 56 so that the shoe 56 will cam over any obstruction engaged thereby. For a compact transport position 61, the telescopingg leg members 34, 36 can be completely collapsed and locked into position by the pin 50. As can be seen in FIG. 1, a primary use for the instant invention is to support the feeder house/header combination when it is detached from the combine 10. This practice would be advantageous when attention is necessary to the front part of the combine 10 rearward of the feeder housing 18. To facilitate the reconnection of the feeder house/header combination, it is desirable to maintain the position of the shafts 20 relative to the ground 44 for ease of connection to the pivot bracket 22.

One skilled in the art will readily realize that other linearly adjustable leg member structure, such as an infinitely adjustable screw mechanism, will be equivalent to the slidingly telescoping leg members 34, 36 described herein. One skilled in the art will further realize that by placing the tubular bracket 51 adjacent the rearward side 35 of the leg member 34, the forces involved, when the jack stand is in an angularly disposed operating position, exemplified by positions 63 or 65, tend to push the pin 50 through the leg member 34, rather than pull the bracket 51 away from the leg member 34, resulting in a much stronger locking mechanism; however, the instant invention should not be construed as being limited to this particular configuration.

From the foregoing, it will be seen that the combination of longitudinal adjustment, plus angular adjustment of the members 34, 36 will provide a relatively infinite variety of adjustments of the vertical distance between the pivot 32 and supporting surface 44, even where the maximum required vertical support distance is more than twice as great as the minimum required vertical support distance, simply by manipulation of the two said adjustment features, relative to a wide range of agricultural attachments.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A jack stand especially adapted for connection to an agricultural attachment, such as feeder housings, which are connectable to a powered agricultural machine, such as a combine, said jack stand being attachable to an appropriate location on said attachment to support the same in position for ready reconnection to such machine and comprising in combination, a supporting bracket comprising a pair of parallel plates secured in spaced relationship and connectable to said attachment and respectively provided with an arcuate row of positioning sockets disposed in an arc at equal radii around a pivot on said plates, a telescoping pair of leg members adjustable longitudinally, one end of one of said leg members being pivotally connected between said plates for pivotal movement in a vertical plane, pin means cooperable with said leg members and said positioning sockets to position said pair of leg members at a desired angular position relative to said attachment, at least one of said leg members having a longitudinal row of holes transversely therethrough and the other leg member having at least one hole transversely therethrough, a pin insertable through adjustably aligned holes in said leg members when selectively adjusted longitudinally to a desired length, and a shoe connected to the outer end of the other leg member for engagement with a supporting surface, whereby the angular and longitudinal adjustment of said pair of legs respectively relative to said supporting plates and each other afford an extensive range of adjustment vertically between said supporting plate and a supporting surface engaged by said shoe, such that the maximum height is greater than twice the minimum height and still permits compact arrangement thereof when disposed in a retracted inoperative position.

2. The jack stand according to claim 1 in which said shoe is connected to the lower end of said other leg member for limited pivotal movement and said pivot being spaced forwardly of the center of gravity of said shoe relative to the direction in which said vehicle or implement is moved in a forward direction to cause the trailing end of said shoe to extend lower than the forward end thereof and thereby be positioned to be cammed over any obstructions engaged thereby during travel relative to a supporting surface when said supporting legs are moved pivotally to a retracted trailing position.

3. The jack stand according to claim 1 in which said telescoping leg members are slidably complementary non-circular tubes of predetermined length preventing relative axial rotation.

* * * * *